United States Patent
Li

(10) Patent No.: US 10,900,541 B1
(45) Date of Patent: Jan. 26, 2021

(54) CLUTCH CONTROL STRATEGY FOR SHIFTING A TRANSMISSION

(71) Applicant: GM GLOBAL TECHNOLOGY OPERATIONS LLC, Detroit, MI (US)

(72) Inventor: Dongxu Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 20 days.

(21) Appl. No.: 16/508,832

(22) Filed: Jul. 11, 2019

(51) Int. Cl.
  *F16H 1/28* (2006.01)
  *F16H 3/44* (2006.01)

(52) U.S. Cl.
  CPC .......... *F16H 3/44* (2013.01); *F16H 1/28* (2013.01); *F16D 2500/50646* (2013.01); *F16H 2200/201* (2013.01); *F16H 2200/2023* (2013.01); *F16H 2200/2038* (2013.01); *F16H 2200/2043* (2013.01); *F16H 2200/2066* (2013.01); *F16H 2200/2097* (2013.01)

(58) Field of Classification Search
  CPC ... B60K 17/08; F16H 3/44; F16H 1/28; F16D 2500/50646
  See application file for complete search history.

(56) References Cited

U.S. PATENT DOCUMENTS

| | | | |
|---|---|---|---|
| 2002/0005077 A1* | 1/2002 | Ozaki | F16H 61/0403 74/336 R |
| 2003/0100985 A1* | 5/2003 | Matsumura | F16H 61/0437 701/55 |
| 2007/0175720 A1* | 8/2007 | Yoshida | F16H 57/0434 192/3.63 |
| 2013/0196814 A1* | 8/2013 | Gumpoltsberger | F16H 3/44 475/284 |
| 2014/0329635 A1* | 11/2014 | Otanez | F16H 3/66 475/271 |
| 2017/0059006 A1* | 3/2017 | Eo | F16H 3/006 |

* cited by examiner

*Primary Examiner* — Stacey A Fluhart
(74) *Attorney, Agent, or Firm* — Quinn IP Law

(57) ABSTRACT

A method of shifting a transmission having a lever configuration including input and output nodes, a first node configured for engagement with a first clutch in a first gear state, and a second node configured for engagement with a second clutch in a second gear state. The transmission is capable of clutch-to-clutch shifting from the first to the second gear state without engagement of a third clutch, the third clutch being capable of connecting two of the nodes during a transition from the first to the second gear state so as to urge the first node from a first lever position to a second lever position. In the first gear state, the first clutch is engaged. During a torque phase, disengagement of the first clutch and engagement of the second clutch are initiated, and during an inertia phase, the third clutch is engaged to connect the two nodes.

20 Claims, 3 Drawing Sheets

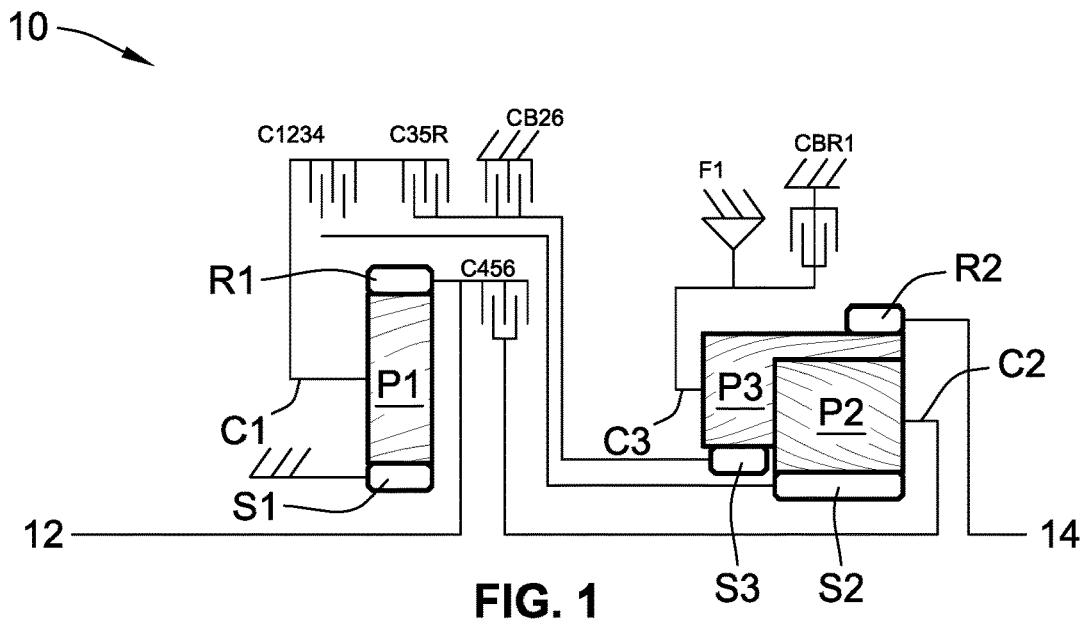
FIG. 1
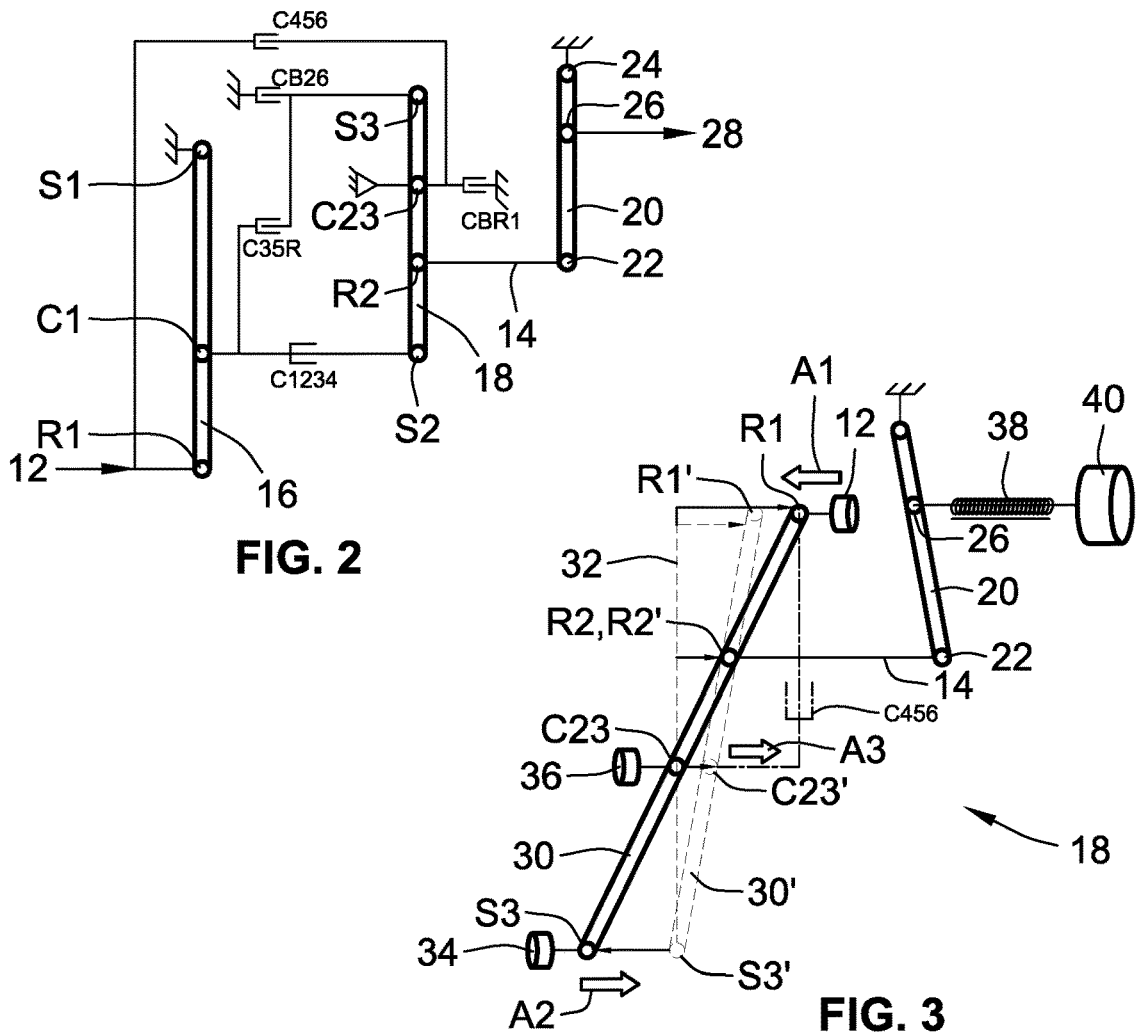
FIG. 2
FIG. 3

CLUTCH CONTROL STRATEGY FOR SHIFTING A TRANSMISSION

This disclosure relates generally to clutch control strategies for controlling the shifting of transmissions.

In the control of automatic, hybrid and other transmissions capable of clutch-to-clutch shifting, the engagement of oncoming clutches and brakes, and the disengagement of offgoing clutches and brakes, are carefully timed. Oncoming hydraulic clutches are pressurized from a lower pressure level to a higher pressure level, and the reverse of this process occurs for offgoing clutches; therefore, the processes of clutch engagement and disengagement are not instantaneous, but take a finite amount of time. Often there is an overlap in timing between when an offgoing clutch is disengaging and when an oncoming clutch is engaging. Although these engagement and disengagement processes may occur very rapidly, they are nonetheless carefully timed so that shifts occur smoothly.

When the timing of oncoming and offgoing clutches is such that both clutches are engaged relatively simultaneously, a condition known as clutch overlap or tie-up can occur. Contrarily, when neither of the clutches is engaged sufficiently, a condition known as clutch underlap or engine flare can occur. Given the complexity of transmissions having multiple planetary gearsets, multiple interconnections among the gearset members, and multiple clutches and brakes, it is often thought that the number of clutches and brakes that may be engaged to accomplish shifts should be held to a minimum.

SUMMARY

According to one embodiment, a method of shifting a transmission from a first gear state to a second gear state is provided. The transmission has a lever configuration including, in the first and second gear states, an input node, an output node, a first node configured for engagement with a first clutch in the first gear state, and a second node configured for engagement with a second clutch in the second gear state. The first node has a first lever position in the first gear state and a second lever position in the second gear state, the transmission being capable of clutch-to-clutch shifting from the first gear state to the second gear state without engagement of a third clutch, and the third clutch being capable of connecting a selected one of the nodes to a selected other of the nodes during a transition from the first gear state to the second gear state so as to urge the first node from the first lever position to the second lever position. The method includes: engaging the first clutch in the first gear state; during a torque phase of the transition, initiating a disengagement of the first clutch and an engagement of the second clutch; and during an inertia phase of the transition, engaging the third clutch to connect the selected one of the nodes and the selected other of the nodes.

The method may further include disengaging the third clutch at a completion of the inertia phase, as well as completing a disengagement of the first clutch at a completion of the torque phase. During the transition, the first clutch may be an offgoing clutch and the second clutch may be an oncoming clutch. The first and second gear states may be fixed ratio gear states and/or may be adjacent gear ranges, and the first and second clutches may be brakes. The method may further include engaging a holding clutch in the first gear state, during the transition from the first gear state to the second gear state, and in the second gear state. The third clutch may be a non-holding clutch, and the transmission may be configured for engaging the third clutch in a third gear state different from each of the first and second gear states. Engagement of the third clutch during the inertia phase may enable the transition to be faster than non-engagement of the third clutch during the inertia phase.

According to one embodiment, a method of shifting a transmission is provided, the transmission being configured for a plurality of gear states including a first gear state and a second gear state. The transmission has a lever configuration including, in the first and second gear states, an input node, an output node, a first node configured for engagement with a first coupling member in the first gear state, and a second node configured for engagement with a second coupling member in the second gear state. The first node has a first lever position in the first gear state and a second lever position in the second gear state, the transmission being capable of clutch-to-clutch shifting from the first gear state to the second gear state without engagement of a third coupling member, and the third coupling member being capable of connecting a predetermined one of the nodes to a predetermined other of the nodes during a transition from the first gear state to the second gear state so as to urge the first node from the first lever position to the second lever position. The method includes: engaging the first coupling member in the first gear state; during a torque phase of the transition, initiating a disengagement of the first coupling member and an engagement of the second coupling member; during an inertia phase of the transition, engaging the third coupling member to connect the predetermined one of the nodes and the predetermined other of the nodes; and at a completion of the inertia phase, disengaging the third coupling member.

The method may also include completing the engagement of the second coupling member at the completion of the inertia phase. During the transition, the first coupling member may be an offgoing clutch and the second coupling member may be an oncoming clutch. The first and second gear states may be fixed ratio gear states. The method may further include engaging a holding coupling member in the first gear state, during the transition from the first gear state to the second gear state, and in the second gear state, wherein the holding coupling member is not the third coupling member. Engagement of the third coupling member during the inertia phase may enable the transition to be faster than non-engagement of the third coupling member during the inertia phase.

According to one embodiment, a controller for shifting a transmission from a first gear state to a second gear state is provided. The transmission has a lever configuration including in the first and second gear states an input node, an output node, a first node configured for engagement with a first clutch in the first gear state, and a second node configured for engagement with a second clutch in the second gear state, the first node having a first lever position in the first gear state and a second lever position in the second gear state, the transmission being capable of clutch-to-clutch shifting from the first gear state to the second gear state without engagement of a third clutch, wherein the third clutch is capable of connecting a predetermined one of the nodes to a predetermined other of the nodes during a transition from the first gear state to the second gear state so as to urge the first node from the first lever position to the second lever position. The controller contains an instruction set, the instruction set executable to: engage the first clutch in the first gear state; during a torque phase of the transition, initiate a disengagement of the first clutch and an engagement of the second clutch; during an inertia phase of the transition, engage the third clutch to connect the predetermined one of the nodes and the predetermined other of the nodes; and at a completion of the inertia phase, disengage the third clutch.

During the transition, the first clutch may be an offgoing clutch and the second clutch may be an oncoming clutch. The first and second gear states may be fixed ratio gear states. The instruction set may be further executable to engage a holding clutch in the first gear state, during the transition from the first gear state to the second gear state, and in the second gear state, wherein the holding clutch is not the third clutch. The transmission may be configured for engaging the third clutch in a third gear state different from each of the first and second gear states. Engagement of the third clutch during the inertia phase may enable the transition to be faster than non-engagement of the third clutch during the inertia phase.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 1 is a stick diagram for an exemplary transmission in accordance with the disclosure.

FIG. 2 is a lever diagram for the exemplary transmission shown in FIG. 1, in accordance with the disclosure.

FIG. 3 is a lever and velocity diagram of a 1-2 upshift for the exemplary transmission shown in FIGS. 1 and 2, in accordance with the disclosure.

DETAILED DESCRIPTION

Figure 4:
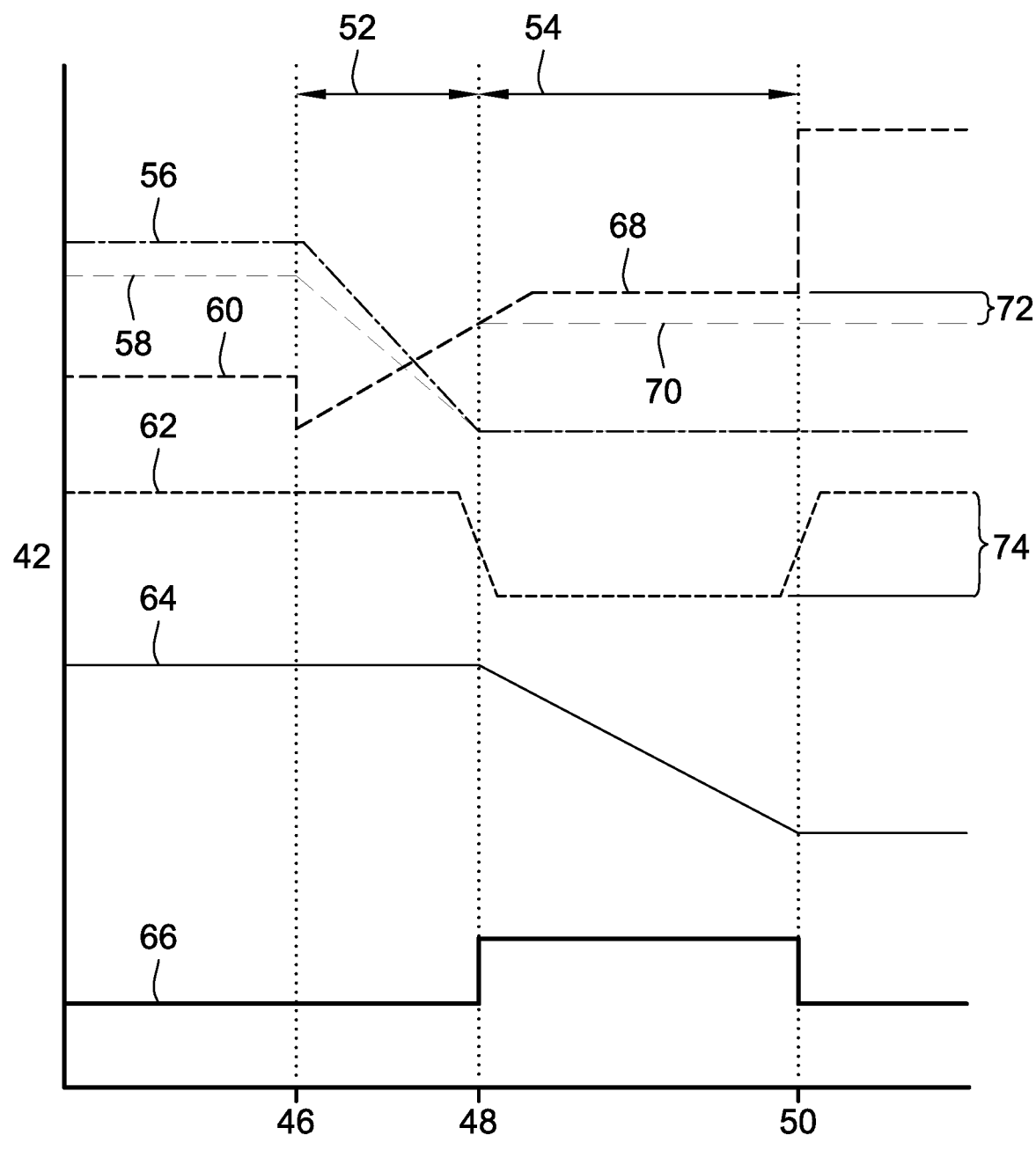
FIG. 4 graphically shows operation of a control method on vehicle powertrain systems in accordance with the disclosure.

Referring now to the drawings, wherein like numerals indicate like parts in the several views, a method 100 and system 200 for a clutch control strategy for shifting an automatic, hybrid or other transmission 10 are shown and described herein.

As discussed above, a common approach to controlling the shifting of transmissions capable of clutch-to-clutch shifting is to use as few clutches and brakes as possible to achieve the desired shifts. For example, a common approach is to utilize one oncoming clutch and one offgoing clutch for a given shift. While an additional holding clutch may also be employed during a shift, the holding clutch stays engaged throughout the entire shift, so that the sole clutch changes during the shift are the offgoing clutch disengaging and the oncoming clutch engaging. However, the approach described in the present disclosure goes against this common approach, by utilizing a clutch that is not normally used for a given shift, and/or by utilizing at least one more clutch than the minimum number of clutches needed for the shift.

Note that while the term "clutch" may be used herein, this term may be interpreted as being synonymous with the term "coupling member", which includes both brakes and clutches. Also, while hydraulic clutches are used as an exemplary embodiment herein, the present disclosure may also apply to other types of clutches, such as mechanical, electrical, pneumatic and other types as well. Also, while a specific type of automatic transmission (and its related stick and lever diagrams) is presented herein as an exemplary embodiment, the approach of the present disclosure may apply to many different types of transmissions, including hybrid transmissions, automatic transmissions other than the exemplary six-speed transmission used as an example herein, and other types of transmissions capable of clutch-to-clutch shifting.

FIG. 1 shows a stick diagram of an exemplary automatic transmission 10. The transmission 10 has a simple planetary gearset and a compound Ravigneaux gearset (together forming a Lepelletier gearset), providing six forward gears and one reverse gear. The simple gearset has a grounded first sun gear S1, a first set of planet gears P1 rotatably connected to a first carrier C1, and a first ring gear R1. The compound gearset has an inner second sun gear S2 engaged with a second set of short planet gears P2, and an outer third sun gear S3 engaged with a third set of long planet gears P3. The short planet gears P2 are engaged with the long planet gears P3, and both sets of planet gears P2, P3 are rotatably connected to a single carrier, part of which C2 is connected to a rearward or downstream side of the compound gearset, and another part of which C3 is connected to a frontward or upstream side of the compound gearset. (As used here, "rearward" and "downstream" refer to the rightward part or direction of the stick diagram, while "frontward" and "upstream" refer to the leftward part or direction of the stick diagram.) A second ring gear R2 is engaged with the long planet gears P3. The input 12 from the engine and torque converter (not shown) is connected to the first ring gear R1, and the output 14 from the transmission 10 is connected to the second ring gear R2. Various clutches and brakes are also included; these are designated in the drawings with the letter "C" to indicate a clutch or "CB" to indicate a "clutch brake" (also referred to simply as a brake). A one-way or freewheeling clutch F1 is also provided. Each of the clutch and brake designations also includes letters and/or numbers to indicate the gear ranges the clutch or brake is used in. For example, "C1234" refers to a clutch that is engaged during first through fourth gears, and "CBR1" refers to a clutch brake that is engaged during reverse (R) and first gear.

FIG. 2 shows a lever diagram of the transmission 10 and stick diagram of FIG. 1. As is known to those skilled in the art of transmissions, a lever diagram may be created to represent the kinematic relationships among the various transmission members. Note that the simple gearset is represented by lever 16, while the compound gearset is represented by lever 18. In addition to these two gearsets, a final drive (e.g., differential and axles) is represented by lever 20, where the output 14 of the transmission from the second ring gear R2 is connected to a first node 22 of the lever 20. A second node 24 of the lever 20 is grounded, and a third node 26 provides output 28 to the wheels (not shown). Note that the lever 18 of the compound gearset includes nodes for the second sun gear S2, the second ring gear R2, the third sun gear S3, and a node labeled C23 representing the single carrier for the second and third sets of planetary gears P2, P3, which is shown in FIG. 1 as having rearward and forward parts C2, C3.

FIG. 3, which is a lever and velocity diagram for a portion of the transmission 10, shows the lever 18 for the compound gearset, plus the lever 20 for the final drive, with the compound gearset lever 10 shown in two different orientations. The first orientation 30 shows the lever 18 drawn in solid lines, while the second orientation 30' shows the lever 18 in dashed lines. (For elements that appear in FIG. 3 in both the first orientation 30 and the second orientation 30', unaccented reference numbers may be used to refer to that element in the first orientation 30 and accented reference numbers may be used to refer to that element in the second orientation 30'. Note that in some places throughout the description an unaccented reference number may be mentioned, and this may refer to the related node and/or both orientations 30, 30' of the node.) For this particular transmission 10, the first orientation 30 may represent first gear and the second orientation 30' may represent second gear; thus, the transition from the first orientation 30 to the second orientation 30' represents a "1-2 upshift" (i.e., an upshift from first gear to second gear). In first gear, the C1234 clutch and the CBR1 brake are engaged. When the C1234 clutch is engaged, it connects the C1 node of the simple lever 16 to the S2 node of the compound lever 18, and when the CBR1 brake is engaged, it grounds the C23 node of the compound lever 18. During the transition from first gear to second gear, the CBR1 brake disengages while the CB26 brake engages, with the C1234 clutch remaining engaged both during the transition and after the transition to second gear. Thus, clutch C1234 may be referred to as a "holding" clutch during a 1-2 upshift for this transmission 10, since it "holds" or remains engaged during the transition from first gear to second gear. When the CB26 brake is engaged, the S3 node of the compound lever 18 is grounded; meanwhile, the C1234 clutch remains engaged, thereby causing nodes C1 and S2 to remain connected.

Since nodes C1 and S2 remain connected throughout the entire 1-2 upshift, these nodes may be "collapsed" or merged together, such that the lever 18 shown in FIG. 3 results. This collapsed or merged lever 18 is shown "upside down" or inverted compared to the levers of FIG. 2; this has been done simply for convenience, but the same interconnections and gear ratios of FIG. 2 are preserved in the inverted lever 18 shown in FIG. 3. From one end of the inverted lever 18 to the other, starting with the top of the drawing in FIG. 3, there are nodes for the first ring gear R1, R1' connected to the input 12, the second ring gear R2, R2' connected to the output 14, the carrier C23, C23' for the compound gearset, and the third sun S3, S3'. In the lever 20 for the final drive, the output 28 to the wheels acting at node 26 is represented by a system comprising a spring 38 (e.g., axle stiffness) and a lumped inertia 40. Likewise, the engine and torque converter (not shown) which act as the input to the transmission 10 are shown as an inertia or mass 12 acting on the first ring gear node R1, R1', and similarly the inertias at the compound carrier node C23, C23' and the third sun gear node S3, S3' are shown as inertias 36 and 34, respectively.

Vertical line 32 represents a zero velocity reference line for visualizing the relative speeds of the various nodes with respect to this line. When a node falls on this line 32 in one of the two orientations 30, 30', then that node will be moving at zero velocity for that orientation (i.e., it will be grounded). For example, in the first orientation 30 (i.e., first gear), note that node C23 falls on this line 32. This signifies that the compound carrier C23 is grounded in this orientation 30, and thus is not moving or rotating. And in fact, this is true, since in the first orientation 30 (first gear) brake CBR1 is engaged, which grounds node C23. Note that none of the other three nodes falls on this line 32, but each is spaced a respective distance to the left or right of this line 32. A small arrow points from the vertical reference line 32 to the right to node R2, indicating that node R2 (or the second ring gear) is moving (rotating) at a relatively small speed, compared to the relatively large speed that node R1 (the first ring gear) is moving, as indicated by the relatively large arrow pointing from the vertical reference line 32 to the right to node R1. At the other end of the lever 18, a relatively large arrow points to the left from the vertical line 32 to node S3, indicating that the third sun gear is rotating in a direction opposite to the direction of rotation of nodes R1 and R2. While forces related to these motions are acting at nodes R1, R2 and S3, a contrary force is acting at node R2 from the final drive, represented by the spring-damper-lever system 38, 40, 20.

In the second orientation 30' (i.e., second gear), note that node S3' falls on the vertical reference line 32. This signifies that the third sun gear S3 is grounded in this orientation 30', and thus is not moving or rotating. In this second orientation 30 (second gear), brake CB26 is engaged, which grounds the third sun gear S3. Note that none of the other three nodes falls on the zero velocity line 32, but each is spaced a respective distance to the right of this line 32. When the transmission 10 transitions from the first orientation 30 to the second orientation 30', the node for the first ring gear move to the left from node R1 to R1' (indicated by arrow A1), while the nodes for the third sun gear and the compound carrier both move to the right (indicated by arrows A2 and A3, respectively). The node for the second ring gear R2, R2' stays at the same location; so with the leftward motion of the R1 nodes indicated by arrow A1, the rightward motion of the S3 and C23 nodes indicated by arrows A2 and A3, and the stationary disposition of the R2 node, the lever 18 appears to rotate counterclockwise (CCW) about the second ring gear node R2. In this CCW rotation (i.e., the shift from first gear to second gear): (i) the speed of the first ring gear decreases from the large rightward arrow pointing at R1 to the smaller rightward arrow pointing at R1'; (ii) the speed of the second ring gear R2 stays the same; (iii) the speed of the compound carrier increases from zero at C23 to a non-zero value at C23'; and (iv) the speed of the third sun gear decreases from a non-zero value at S3 to zero at S3'.

FIG. 4 shows various powertrain operation curves for an exemplary 1-2 upshift. The vertical axis 42 represents magnitude and the horizontal axis 44 represents time, with three particular times highlighted as represented by vertical dotted lines 46, 48 and 50. Times 46 and 48 represent the beginning and end, respectively, of the torque phase 52 of the 1-2 upshift, while times 48 and 50 represent the beginning and end, respectively, of the inertia phase 54 of the 1-2 upshift. (Thus, time 48 is both the end of the torque phase 52 and the beginning of the inertia phase 54. In actual practice, the beginnings and ends of these phases 52, 54 may vary somewhat from the illustration shown here. Also, while a 1-2 upshift is illustrated here, similar processes, events and flow logic may apply to downshifts and to other shifts between gear states.) Line 56 is the offgoing clutch capacity (pressure), line 58 is the offgoing clutch torque, line 60 is the oncoming clutch torque (pressure), line 62 is engine torque, line 64 is turbine speed, and line 66 is the pressure of a third clutch (to be described in more detail below).

Before time 46, the transmission 10 is in first gear 30 and a first clutch/brake CBR1 is engaged. (As described further below, a holding clutch C1234 may also be engaged during first and second gears 30, 30', including during the transition time when shifting from first gear 30 to second gear 30'.) At time 46, a transition begins for the shifting from first gear 30 to second gear 30, and this transition includes a torque phase 52 (from time 46 to time 48) followed by an inertia phase 54 (from time 48 to time 50). At time 50, the transition is complete and the transmission 10 is in second gear 30'.

At time 46, the torque phase 52 of the transition begins, and the first clutch/brake CBR1 begins disengagement (making CBR1 an offgoing clutch at this point), while a second clutch/brake CB26 begins engagement (thus becoming an oncoming clutch). At time 48, the torque phase 52 has been completed, and at this time 48 the disengagement of the first clutch/brake CBR1 has been completed. Also at time 48, the inertia phase 54 of the transition begins, and at this time 48 an engagement of the abovementioned third clutch C456 begins. As further described below, this third clutch C456 is not normally engaged during a 1-2 upshift for the exemplary transmission 10, but engagement of this clutch C456 during the inertia phase 54 provides some unexpected advantages, as elucidated in more detail below. By the end 50 of the inertia phase 54, the third clutch C456 is disengaged, and the engagement of the second clutch/brake CB26 has been completed.

Line 60 represents the clutch torque (pressure) of the oncoming clutch CB26. During the inertia phase 54, line 60 may normally have a level represented by dashed horizontal line 70, but by arranging for the oncoming clutch torque (pressure) to have some additional capacity 72, the level provided may be represented by solid horizontal line 68. This helps to provide good clutch handoff at the end of the torque phase 52 (along with managing the offgoing clutch timing, plus controlling the engine torque 62 by managing the decrease 74 in engine torque during the inertia phase 54).

Figure 5:
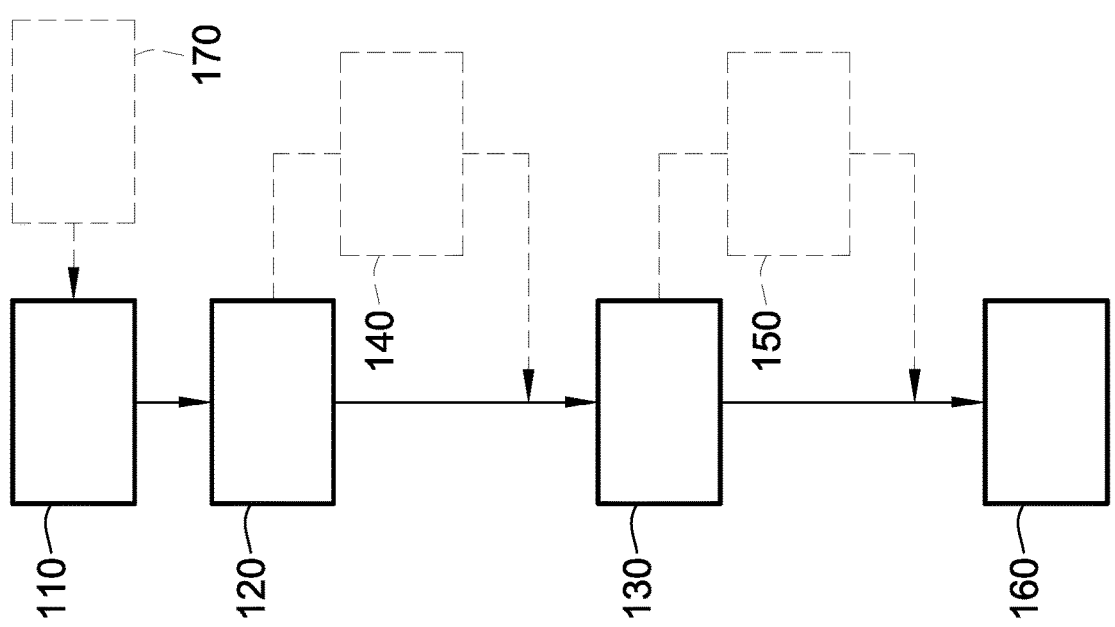
FIG. 5 is a flowchart for a method of shifting in accordance with the disclosure.

FIG. 5 shows a flowchart for a method 100 of shifting an automatic, hybrid or other type of transmission 10 from a first gear state 30 to a second gear state 30'. (Note that 30 and 30' are used herein to denote the first and second gear states as well as the first and second orientations of lever 18. Also note that the first and second gear states may be fixed ratio states, i.e., fixed ratio gear states.) The transmission 10 has a lever configuration (as may be represented in a lever diagram) which includes, in the first and second gear states 30, 30', an input node, an output node, a first node configured for engagement with a first clutch in the first gear state 30, and a second node configured for engagement with a second clutch in the second gear state 30'. Using the transmission 10 illustrated in the drawings as an example, the first and second gear states 30, 30' may be first and second gears, the input node may be the first ring gear node (R1, R1'), the output node may be the second ring gear node (R2, R2'), the first node may be the compound carrier node (C23, C23'), the first clutch may be CBR1, the second node may be the second sun gear node (S2, S2'), and the second clutch may be CB26. The first node has a first lever position in the first gear state or lever orientation 30, and a second lever position in the second gear state or lever orientation 30'. Again using the exemplary transmission 10 as an example, the first node may be the compound carrier node, which has a first lever position C23 in the first lever orientation (first gear) 30, and a second lever position C23' in the second lever orientation (second gear) 30'.

The method 100 is compatible with a transmission 10 that is capable of clutch-to-clutch shifting from the first gear state 30 to the second gear state 30' without the engagement of a third clutch, with the third clutch being capable of connecting a selected or predetermined one of the nodes to a selected or predetermined other of the nodes during a transition from the first gear state 30 to the second gear state 30', so as to urge the first node from the first lever position to the second lever position. (The selected or predetermined one or other of the nodes are selected or predetermined from among the four nodes mentioned above: i.e., the input node, the output node, the first node and the second node.) For example, the third clutch may be C456, because the transmission 10 is capable of shifting from first gear to second gear without C456. (In fact, C456 is normally used for fourth, fifth and sixth gears, and not for first or second gear.) However, C456 is capable of connecting the compound carrier node (C23, C23') to the input/first ring gear node (R1, R1') during a transition from first gear 30 to second gear 30'; and by engaging C456 in this unusual and counterintuitive way, C456 is able to urge the compound carrier node from its first lever position C23 to its second lever position C23' (e.g., along arrow A3). This ability to urge the compound carrier node C23 in the desired direction (to C23') when clutch C456 is engaged is due, at least in part, to the first ring gear node R1 being connected with the input 12 from the engine and torque converter; the inertia contributed from this connection helps move not just the first ring gear node R1, but also the compound carrier node C23 via the engaged C456 clutch. In FIG. 3, clutch C456 is drawn in phantom lines connecting the first ring gear node (R1, R1') to the compound carrier node (C23, C23') to indicate that this is a non-typical connection, but one which can optionally be engaged to help urge the compound carrier node C23 in the desired direction along arrow A3.

Another way of using the transmission 10 shown in the drawings to illustrate the method 100 of the present disclosure is to visualize the first ring gear node (R1, R1') as the first node, instead of visualizing the compound carrier node (C23, C23') as the first node. In this visualization, the first ring gear node is urged from a first position R1 to a second position R1', via the C456 clutch engagement. And yet another way of visualizing the method 100 is to view it as moving the lever 18 from a first orientation 30 to a second orientation 30', such as in the CCW rotation of the lever 18 described above.

At block 110, the method 100 includes engaging the first clutch in the first gear state. This can be exemplified in the exemplary transmission 10 by engaging brake CBR1 in first gear 30. At block 120, during a torque phase 52 of the transition from the first gear state to the second gear state, a disengagement of the first clutch and an engagement of the second clutch are initiated. This may be exemplified by initiating the disengagement of brake CBR1 and initiating the engagement of brake CB26 during the torque phase 52 of the shift from first gear 30 to second gear 30'. At block 130, during an inertia phase 54 of the transition, the third clutch is engaged to connect the selected one of the nodes and the selected other of the nodes. This can be represented as engaging clutch C456 to connect the compound carrier node C23 to the input/first ring gear node R1. At block 160, the method 100 may further include disengaging the third clutch at a completion of the inertia phase 54, which can be represented as disengaging clutch C456. Blocks 140, 150 and 170 are shown with dashed arrows to indicate that they are optional portions of the method 100. At block 140, a disengagement of the first clutch may be completed at a completion of the torque phase 52; for example, the disengagement of brake CBR1 may be completed at the end of the torque phase 52. At block 150, an engagement of the second clutch may be completed at the completion of the inertia phase 54; e.g., the engagement of brake CB26 may be completed at the end of the inertia phase 54. During the transition from the first gear state or lever orientation 30 to the second gear state or lever orientation 30', the first clutch (e.g., CBR1) may be an offgoing clutch and the second clutch (e.g., CB26) may be an oncoming clutch. The first and second gear states 30, 30' may be adjacent gear ranges (such as first and second gear, second and third gear, sixth and seventh gear, etc.), and the first and second clutches may be brakes (e.g., CBR1 and CB26, respectively). At block 170, the method 100 may further include engaging a holding clutch in the first gear state 30, during the transition from the first gear state 30 to the second gear state 30', and in the second gear state 30'. For example, clutch C1234 may be continuously engaged in first gear 30, during the transition from first gear 30 to second gear 30' (including the torque phase 52 and inertia phase 54), and in second gear 30'. The third clutch (e.g., C456) may be a non-holding clutch (that is, it is not continuously engaged during a shift between gears like C1234 is when shifting from first gear 30 to second gear 30'), and the transmission 10 may be configured for engaging the third clutch in a third gear state different from each of the first and second gear states 30, 30' (e.g., C456 may be configured for use in fourth gear, as well as fifth gear and sixth gear). In the method 100 of the present disclosure, engagement of the third clutch during the inertia phase 54 of the transition from the first gear state 30 to the second gear state 30' may enable the transition to be faster than non-engagement of the third clutch during the inertia phase 54.

Figure 6:
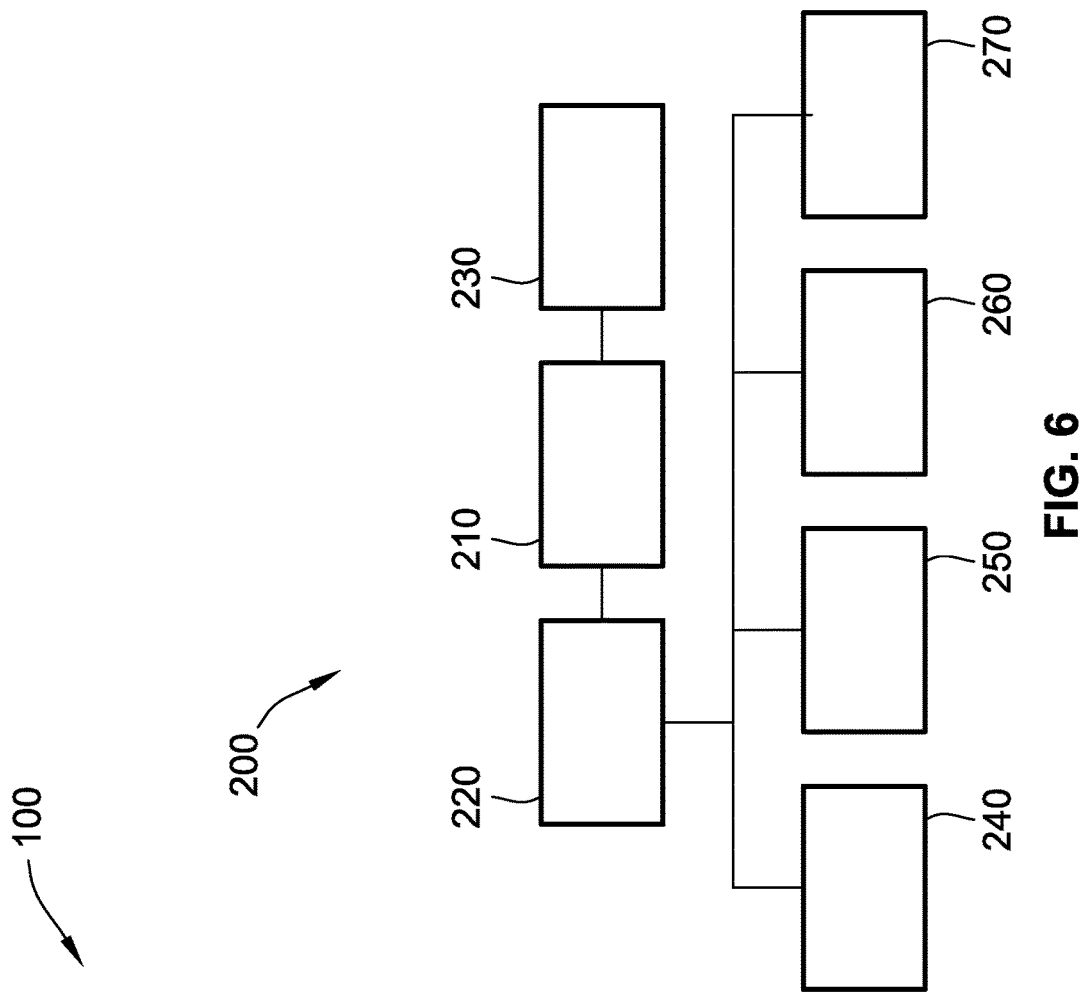
FIG. 6 is a block diagram of a system, including a controller, for controlling a transmission in accordance with the disclosure.

FIG. 6 shows a block diagram of a system 200 according to the present disclosure. The system 200 includes a controller 210 for shifting an automatic, hybrid or other type of transmission 220 (such as the abovementioned exemplary transmission 10) from a first gear state to a second gear state (e.g., upshifting from first gear to second gear), in accordance with the method 100 described above. The transmission 220 includes a first clutch 240, a second clutch 250, a third clutch 260 and an optional fourth clutch 270, corresponding to the first, second, third and holding clutches described in the method 100 above. The controller 210 contains an instruction set 230, the instruction set 230 executable to: (i) engage the first clutch 240 in the first gear state; (ii) during a torque phase of the transition, initiate a disengagement of the first clutch 240 and an engagement of the second clutch 250; (iii) during an inertia phase of the transition, engage the third clutch 260 to connect the predetermined one of the nodes and the predetermined other of the nodes; and (iv) at a completion of the inertia phase, disengage the third clutch 260. The instruction 230 set may be further executable to engage a fourth holding clutch 270 in the first gear state, during the transition from the first gear state to the second gear state, and in the second gear state, wherein the holding clutch 270 is not the third clutch 260.

As noted earlier, while a specific type of six-speed automatic transmission (and its related stick and lever diagrams), and a particular 1-2 upshift for the transmission 10, have been presented herein as an exemplary embodiment, the approach of the present disclosure may apply to many different types of automatic, hybrid and other transmissions and many different shifting schemes for such transmissions. Thus, any references herein to specific elements, features or characteristics of the transmission 10 and its shifting should be construed as merely exemplary and understood to apply to other relevant transmissions and shifting schemes as well.

The above description is intended to be illustrative, and not restrictive. While various specific embodiments have been presented, those skilled in the art will recognize that the disclosure can be practiced with various modifications within the spirit and scope of the claims. For example, in the following claims, use of the terms "first", "second", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Moreover, unless explicitly stated to the contrary, embodiments "comprising" or "having" an element or a plurality of elements having a particular property may include additional such elements not having that property.

The flowcharts and block diagrams in the drawings illustrate the architecture, functionality and/or operation of possible implementations of systems, methods and computer program products according to various embodiments of the present disclosure. These program instructions may also be stored in a computer-readable medium that can direct a controller or other programmable data processing apparatus to function in a particular manner, such that the instructions stored in the computer-readable medium produce an article of manufacture including instructions to implement the actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method of shifting a planetary transmission from a first gear state to a second gear state, the transmission having a lever configuration including a plurality of nodes that represent rotation elements of the transmission, the plurality of nodes including in the first and second gear states an input node, an output node, a first node configured for engagement with a first clutch in the first gear state, and a second node configured for engagement with a second clutch in the second gear state, the first node having a first lever position in the first gear state and a second lever position in the second gear state, the transmission being capable of clutch-to-clutch shifting from the first gear state to the second gear state without engagement of a third clutch, the third clutch being capable of connecting a selected one of the nodes to a selected other of the nodes during a transition from the first gear state to the second gear state so as to urge the first node from the first lever position to the second lever position, comprising:

engaging the first clutch in the first gear state;

during a torque phase of the transition, initiating a disengagement of the first clutch and an engagement of the second clutch; and during an inertia phase of the transition, engaging the third clutch to connect the selected one of the nodes and the selected other of the nodes.

2. A method according to claim 1, further comprising: at a completion of the inertia phase, disengaging the third clutch.

3. A method according to claim 1, further comprising: at a completion of the torque phase, completing a disengagement of the first clutch.

4. A method according to claim 1, wherein during the transition, the first clutch is an offgoing clutch and the second clutch is an oncoming clutch.

5. A method according to claim 1, wherein the first and second gear states are adjacent gear ranges.

6. A method according to claim 1, wherein the first and second clutches are brakes.

7. A method according to claim 1, further comprising: engaging a holding clutch in the first gear state, during the transition from the first gear state to the second gear state, and in the second gear state.

8. A method according to claim 7, wherein the first and second gear states are fixed ratio gear states.

9. A method according to claim 1, wherein the transmission is configured for engaging the third clutch in a third gear state different from each of the first and second gear states.

10. A method according to claim 1, wherein engagement of the third clutch during the inertia phase enables the transition to be faster than non-engagement of the third clutch during the inertia phase.

11. A method of shifting a planetary transmission, the transmission being configured for a plurality of gear states including a first gear state and a second gear state, the transmission having a lever configuration including a plurality of nodes that represent rotation elements of the transmission, the plurality of nodes including in the first and second gear states an input node, an output node, a first node configured for engagement with a first coupling member in the first gear state, and a second node configured for engagement with a second coupling member in the second gear state, the first node having a first lever position in the first gear state and a second lever position in the second gear state, the transmission being capable of clutch-to-clutch shifting from the first gear state to the second gear state without engagement of a third coupling member, is the third coupling member being capable of connecting a predetermined one of the nodes to a predetermined other of the nodes during a transition from the first gear state to the second gear state so as to urge the first node from the first lever position to the second lever position, comprising:
engaging the first coupling member in the first gear state;
during a torque phase of the transition, initiating a disengagement of the first coupling member and an engagement of the second coupling member;
during an inertia phase of the transition, engaging the third coupling member to connect the predetermined one of the nodes and the predetermined other of the nodes; and
at a completion of the inertia phase, disengaging the third coupling member.

12. A method according to claim 11, further comprising:
at the completion of the inertia phase, completing the engagement of the second coupling member.

13. A method according to claim 11, wherein the first and second gear states are fixed ratio gear states.

14. A method according to claim 11, further comprising:
engaging a holding coupling member in the first gear state, during the transition from the first gear state to the second gear state, and in the second gear state, wherein the holding coupling member is not the third coupling member.

15. A method according to claim 11, wherein engagement of the third coupling member during the inertia phase enables the transition to be faster than non-engagement of the third coupling member during the inertia phase.

16. A controller for shifting a planetary transmission from a first gear state to a second gear state, the transmission having a lever configuration including a plurality of nodes that represent rotation elements of the transmission, the plurality of nodes including in the first and second gear states an input node, an output node, a first node configured for engagement with a first clutch in the first gear state, and a second node configured for engagement with a second clutch in the second gear state, the first node having a first lever position in the first gear state and a second lever position in the second gear state, the transmission being capable of clutch-to-clutch shifting from the first gear state to the second gear state without engagement of a third clutch, wherein the third clutch is capable of connecting a predetermined one of the nodes to a predetermined other of the nodes during a transition from the first gear state to the second gear state so as to urge the first node from the first lever position to the second lever position, the controller containing an instruction set, the instruction set executable to:
engage the first clutch in the first gear state;
during a torque phase of the transition, initiate a disengagement of the first clutch and an engagement of the second clutch;
during an inertia phase of the transition, engage the third clutch to connect the predetermined one of the nodes and the predetermined other of the nodes; and
at a completion of the inertia phase, disengage the third clutch.

17. A controller according to claim 16, wherein the first and second gear states are fixed ratio gear states.

18. A controller according to claim 16, wherein the instruction set is further executable to:
engage a holding clutch in the first gear state, during the transition from the first gear state to the second gear state, and in the second gear state, wherein the holding clutch is not the third clutch.

19. A controller according to claim 16, wherein the transmission is configured for engaging the third clutch in a third gear state different from each of the first and second gear states.

20. A controller according to claim 16, wherein engagement of the third clutch during the inertia phase enables the transition to be faster than non-engagement of the third clutch during the inertia phase.

* * * * *